United States Patent
Hodgin (10) Patent No.: US 8,140,363 B2
(45) Date of Patent: Mar. 20, 2012

(54) SYSTEM AND METHOD FOR INTEGRATING HAZARD-BASED DECISION MAKING TOOLS AND PROCESSES

(75) Inventor: C. Reed Hodgin, Westminster, CO (US)

(73) Assignee: AlphaTrac, Inc., Westminster, CO (US)

( * ) Notice: Subject to any disclaimer, the term of this patent is extended or adjusted under 35 U.S.C. 154(b) by 1605 days.

(21) Appl. No.: 11/416,355

(22) Filed: May 2, 2006

(65) Prior Publication Data
US 2007/0033095 A1    Feb. 8, 2007

Related U.S. Application Data

(60) Provisional application No. 60/676,719, filed on May 2, 2005.

(51) Int. Cl.
*G06F 17/60* (2006.01)
(52) U.S. Cl. ...................................... 705/7.11
(58) Field of Classification Search ................. 705/7.11
See application file for complete search history.

(56) References Cited

U.S. PATENT DOCUMENTS

| | | | |
|---|---|---|---|
| 5,726,884 A * | 3/1998 | Sturgeon et al. | 705/7.12 |
| 6,061,506 A * | 5/2000 | Wollaston et al. | 703/23 |
| 6,496,110 B2 | 12/2002 | Peterson et al. | |
| 6,590,496 B2 | 7/2003 | Peterson et al. | |
| 6,594,634 B1 * | 7/2003 | Hampton et al. | 705/3 |
| 6,754,674 B2 | 6/2004 | Meyers et al. | |
| 6,826,552 B1 * | 11/2004 | Grosser et al. | 706/47 |
| 6,868,340 B2 * | 3/2005 | Alexander et al. | 702/5 |
| 6,873,256 B2 * | 3/2005 | Lemelson et al. | 340/539.1 |
| 2001/0056435 A1 * | 12/2001 | Quick | 707/104.1 |
| 2002/0138197 A1 * | 9/2002 | Schramke et al. | 701/213 |
| 2003/0125998 A1 * | 7/2003 | McKenney et al. | 705/7 |
| 2003/0195775 A1 * | 10/2003 | Hampton et al. | 705/3 |

OTHER PUBLICATIONS

Yigal et al (Reporting to the Unexpected), Report of the Workshop Held in NYC, Mar. 2002, pp. 1-74.*

* cited by examiner

*Primary Examiner* — Romain Jeanty
(74) *Attorney, Agent, or Firm* — Polsinelli Shughart PC (57) ABSTRACT

A system and method for inputting, analyzing, and disseminating information necessary for identified decision-makers to respond to emergency situations. This system and method provides consistency and integration among multiple groups, and may be used for both initial consequence-based decisions and follow-on consequence-based decisions. The system and method in a preferred embodiment also provides tools for accessing and manipulating information that are appropriate for each decision-maker, in order to achieve more reasoned and timely consequence-based decisions. The invention includes processes for designing and implementing a system or method for responding to emergency situations.

6 Claims, 8 Drawing Sheets

| EVENT | RELEASE FROM PRIMARY BARRIER | RELEASE FROM STACK | ENERGY (MW) | TIME DURATION (min) | ZONE TYPE | SINGLE/MULTIPLE CONTAINER BREACH | FIRE RADIUS (m) |
|---|---|---|---|---|---|---|---|
| 1 Small Fire | 100% | Yes | 0 | 15 | Interior | Single | 1 |
| 2 Small Fire | 100% | No | 0.5 | 15 | Exterior | Single | 1 |
| 3 Small Fire | 100% | No | 0.5 | 15 | Outside | Single | 1 |
| 4 Large Fire | 100% | No | 6 | 15 | Interior | Multiple | 13.2 |
| 5 Large Fire | 100% | No | 6 | 15 | Exterior | Multiple | 13.2 |
| 6 Large Fire | 100% | No | 6 | 15 | Outside | Multiple | 13.2 |
| 7 Small Spill | 100% | Yes | 0 | 15 | Interior | Single | N/A |
| 8 Small Spill | 100% | Yes | 0 | 15 | Exterior | Single | N/A |
| 9 Small Spill | 100% | No | 0 | 15 | Outside | Single | N/A |
| 10 Explosion | 100% | Yes | 0 | 15 | Interior | Multiple | N/A |
| 11 Explosion | 100% | No | 0 | 15 | Exterior | Multiple | N/A |
| 12 Explosion | 100% | No | 0 | 15 | Outside | Multiple | N/A |
| 13 Liquid Aerosolization | 100% | No | 0 | 15 | Exterior | Single | N/A |
| 14 Liquid Aerosolization | 100% | No | 0 | 15 | Outside | Single | N/A |
| 15 Minor Transportation Event | 100% | No | 0 | 15 | Dock | Single | N/A |
| 16 Small Aircraft Crash | 100% | No | 0 | 15 | Exterior | Multiple | N/A |
| 17 Small Aircraft Crash | 100% | No | 0 | 15 | Outside | Multiple | N/A |
| 18 Large Aircraft Crash | 100% | No | 155 | 15 | Facility | Multiple | 23 |
| 19 Earthquake With No Fire | 100% | No | 0 | 15 | Facility | Multiple | N/A |
| 20 Earthquake With Fire | 100% | No | 66 | 15 | Facility | Multiple | 23 |
| 21 High Wind Missile | 100% | No | 0 | 15 | Exterior | Multiple | N/A |
| 22 High Wind Missile | 100% | No | 0 | 15 | Outside | Multiple | N/A |
| 23 High Wind/Tornado | 100% | No | 0 | 15 | Facility | Multiple | N/A |
| 24 Small Transportation Spill | 100% | No | 0 | 15 | Site Wide | Single | N/A |
| 25 Small Transportation Fire | 100% | No | 0.5 | 15 | Site Wide | Single | 1 |

| Area: | TEST AREA III |
|---|---|
| Facility: | Building HiHaz |
| Facility Zone: | Zone 01 |
| Site Boundary Dist (ft.): | 1,476 |

Event Type: Container Breach

EALs, PROTECTIVE ACTIONS AND EVENT CLASSIFICATION

| Substance | PROTECTIVE ACTION PLAN Material at Risk to Trigger Plan (lbs) | | | | | | EVENT CLASSIFICATION Material at Risk for Class (lbs) | | | | EAL # |
|---|---|---|---|---|---|---|---|---|---|---|---|
| | None | 1 | 2 | 3 | 4 | 5 | None | Alert | SAE | GE | |
| UNKNOWN (Chlorine) | <0.19 | 0.19-1.7 | 1.7-12 | 12-79 | 79-250 | >250 | <0.19 | 0.19-1.7 | 1.7-24 | >24 | HiHaz-0109-01 |
| Anhydrous Ammonia | <2.5 | 2.5-23 | 23-170 | 170-1,100 | 1,100-3,600 | >3,600 | <2.5 | 2.5-23 | 23-330 | >330 | HiHaz-0109-02 |
| Boron Trichloride | <0.24 | 0.24-2.2 | 2.2-16 | 16-100 | 100-340 | >340 | <0.24 | 0.24-2.2 | 2.2-32 | >32 | HiHaz-0109-03 |
| Boron Trifluoride | <0.73 | 0.73-6.6 | 6.6-47 | 47-310 | 310-1,000 | >1,000 | <0.73 | 0.73-6.6 | 6.6-95 | >95 | HiHaz-0109-04 |
| Chlorine | <0.19 | 0.19-1.7 | 1.7-12 | 12-79 | 79-250 | >250 | <0.19 | 0.19-1.7 | 1.7-24 | >24 | HiHaz-0109-05 |
| Fluorine | <0.19 | 0.19-1.7 | 1.7-12 | 12-81 | 81-260 | >260 | <0.19 | 0.19-1.7 | 1.7-25 | >25 | HiHaz-0109-06 |
| Hydrobromic Acid (Hydrogen Bromide) | <0.24 | 0.24-2.2 | 2.2-16 | 16-100 | 100-340 | >340 | <0.24 | 0.24-2.2 | 2.2-32 | >32 | HiHaz-0109-07 |
| Hydrofluoric Acid (70%) | <3.9 | 3.9-41 | 41-330 | 330-2,400 | 2,400-8,400 | >8,400 | <3.9 | 3.8-41 | 41-690 | >690 | HiHaz-0109-08 |
| Nitrogen Trifluoride | <24 | 24-22 | 22-160 | 160-1,000 | 1,000-3,400 | >3,400 | <24 | 24-22 | 22-320 | >320 | HiHaz-0109-09 |
| Tungsten Hexafluoride | <0.18 | 0.18-1.7 | 1.7-12 | 12-79 | 79-250 | >250 | <0.18 | 0.18-1.7 | 1.7-24 | >24 | HiHaz-0109-10 |

PLANNING INVENTORY FOR FACILITY ZONE

| Substance | Container Type | MAR / Cont (lbs) | Release Term (lbs) | PA Plan | Event Class | Distance from Source (ft.) | | | EAL # |
|---|---|---|---|---|---|---|---|---|---|
| | | | | | | PAC | TEL | | |
| UNKNOWN (Tungsten Hexafluoride) | cylinder 24.00lb | 24 | 24 | 3 | GE | 1,480 | 252 | | HiHaz-0109-11 |
| Anhydrous Ammonia | cylinder 50lb | 50 | 50 | 2 | SAE | 576 | 291 | | HiHaz-0109-12 |
| Boron Trichloride | cylinder 10lb | 10 | 10 | 3 | SAE | 809 | 688 | | HiHaz-0109-13 |
| Boron Trifluoride | cylinder 0.4lb | 0.40 | 0.40 | None | None | 0 | 0 | | HiHaz-0109-14 |
| Chlorine | cylinder 15lb | 15 | 15 | 3 | SAE | 1,160 | 382 | | HiHaz-0109-15 |
| Fluorine | cylinder 0.26lb | 0.26 | 0.26 | 1 | Alert | 170 | 0 | | HiHaz-0109-16 |
| Hydrobromic Acid (Hydrogen Bromide) | cylinder 30lb | 30 | 30 | 2 | SAE | 1,430 | 450 | | HiHaz-0109-17 |
| Hydrofluoric Acid (70%) | cylinder 4lb | 4.0 | 0.90 | 1 | Alert | 246 | 0 | | HiHaz-0109-18 |
| Nitrogen Trifluoride | cylinder 44lb | 44 | 44 | 2 | SAE | 1,550 | 565 | | HiHaz-0109-19 |
| Tungsten Hexafluoride | cylinder 24.00lb | 24 | 24 | 3 | GE | 1,480 | 252 | | HiHaz-0109-20 |

FIGURE 8

| Facility | Tool | Figures | Container | Chemical | MAR (g) | Event | BST(g) | Distance to PAC in meters (feet) | Distance to TEL in meters (feet) | PA Plan | Event class |
|---|---|---|---|---|---|---|---|---|---|---|---|
| HiHaz, Zone 1 | Database of Analyzed Hazards | 2 | 15 lb cylinder | chlorine | 6.80E+03 | small spill | 6.80E+03 | 352 | 117 | 3 | SAE |
| | Hazards Assessment Tool | 3, 6, 8 | 15 lb cylinder | chlorine | 6.80E+03 | small spill | 6.80E+03 | 352 | 117 | 3 | SAE |
| | EAL Tool | 10 | 15 lb cylinder | chlorine | 6.80E+03 (15 lbs) | container breach | 6.80E+03 (15 lbs) | 352 (1160)* | 116 (382)* | 3 | SAE |
| | TIA Tool | 12 | 15 lb cylinder | chlorine | 6.80E+03 | small spill | 6.80E+03 | 352 | 117 | 3 | SAE |
| LoHaz, Zone 2 | Database of Analyzed Hazards | 2 | reclaimer | sulfur hexafluoride | 1.58E+06 | small spill | 1.58E+06 | 92 | 92 | 1 | Alert |
| | Hazards Assessment Tool | 4, 7, 9 | reclaimer | sulfur hexafluoride | 1.58E+06 | small spill | 1.58E+06 | 92 | 92 | 1 | Alert |
| | EAL Tool | 11 | reclaimer | sulfur hexafluoride | 1.58E+03 (3500 lbs) | container breach | 1.58E+03 (3500 lbs) | 92 (303) | 92 (303) | 1 | Alert |
| | TIA Tool | 15 | reclaimer | sulfur hexafluoride | 1.58E+06 | small spill | 1.58E+06 | 92 | 92 | 1 | Alert |

SYSTEM AND METHOD FOR INTEGRATING HAZARD-BASED DECISION MAKING TOOLS AND PROCESSES

RELATED U.S. APPLICATION DATA

This application claims priority from Provisional Application No. 60/676,719 filed May 2, 2005, the entire disclosure of which is incorporated herein by reference.

STATEMENT REGARDING FEDERALLY SPONSORED RESEARCH

This invention is made under contract DE-AC05-00OR22750 with the United States Department of Energy. The Federal Government has certain rights in this invention.

BACKGROUND OF THE INVENTION

1. Field of the Invention (Technical Field)

This invention relates to the field of Emergency Management Programs; more particularly, the invention relates to the design and implementation of a system and method for inputting, analyzing, and disseminating information necessary to respond under time-constrained emergency events or hazardous situations. This invention may be used to provide consistency and integration among several groups and individuals, and may be used for both initial consequence-based decisions and follow-on consequence-based decisions.

2. Background Art

Increasingly households, warehouses, laboratories, manufacturing facilities, and municipalities and other governmental entities have been implementing comprehensive Emergency Management Programs (EMP) or Emergency Management Systems (EMS). These programs or systems are designed to provide persons responsible for dangerous or hazardous materials or conditions with the tools and processes necessary to respond quickly and proportionally to the risks associated with those materials or conditions. The risks present with certain materials or conditions may include risk to human life, the risk of contamination and pollution, or the risk to property or other assets. The risk caused by hazardous materials, both accidental and deliberate, for example through an act of terrorism, has become particularly more important in the United States and in other countries. Programs must provide the ability to make time-critical decisions to protect lives, assets and to prevent further damage caused by non-proportional response. One example of the types of programs employed in the past is embodied in the United States Department of Energy's (US DOE) Order No. 151.1, and the accompanying guidelines (See www.oa.doe.gov/emo/documents.html).

Often with these programs there are multiple persons or groups that are part of the response team and who are responsible for implementing the program procedures. These persons or groups often are presented with varying levels of information, at varyingly different times, and in extremely different environments. One example where this problem typically occurs is when a group of individuals with responsibilities for responding to an emergency event or other hazardous situation, herein referred to as a Consequence Assessment Team, has been organized to provide guidance to decision-makers and for controlling damage caused by the event. The Consequence Assessment Team typically receives information in piecemeal fashion from other persons or groups involved in the processes, sometimes with disparate variances, and under conditions that may not require an immediate decision to prevent loss of life. In contrast, an Incident Commander, who is one type of decision-maker often present at the scene of an emergency event, frequently has less than five minutes to make a decision in order to prevent loss of life or other losses from occurring after the time he or she arrives at the site. The Incident Commander often has limited tools for assessing the data, and inadequate time for independent analysis even if all the necessary data is provided in time. Furthermore, the Incident Commander, as well as other individuals who make initial decisions, often has a significant impact on the overall response to the event, and their decisions form the basis for many subsequent decisions. The different persons and groups who provide the Consequence Assessment Team with information often have widely disparate goals, and are provided with different sets of emergency event information that are tailored only to meet those goals, and also have less experience or formal training with respect to the critical decisions they are required to make.

Thus, problems exists with current structured EMP and EMS plans, because the information is either gathered or provided in a way that is inefficient and potentially fatal to at least one person or group requiring that information. This problem causes wide disparity in the magnitude of reaction, ranging anywhere from ordering a complete evacuation within a 10-mile radius, to ordering no evacuation at all, possibly under the exact same conditions. Additionally, the appropriate persons to serve on the Consequence Assessment Team are not included in the design and implementation process, and therefore the constraints placed on the individual or group decision-makers is not taken into consideration. Currently, very few EMP's require communication with local fire, police or other municipal emergency and rescue departments, or are required to consider the restraints, conditions and goals specific to each of these departments. Thus, inconsistent activity among the varying persons and groups is a common problem to the design and implementation of EMP or EMS systems and methods.

These prior art systems and methods have in the past been focused first on data and data-analysis tools and only secondarily on the needs of the ultimate decision-makers, if at all. Because the focus has been primarily on the accuracy and reliability of the information that is provided to the decision-makers, the tools and methods made available were all limited to the format in which the information reasonably could be provided. However, when the Incident Commander arrives at a site, where conditions such as poisonous vapors, open flames, or even explosions may be present, there is no time or place to open a set of building plans or read through multiple pages of plume diagrams. The analysis must be appropriately fashioned to match the individuals' response time and environmental constraints, as well as the individual or group responsibilities, or else it becomes ineffective. Tools provided to assess the level of risk and minimize losses must also be tailored for the decision-maker, and not simply designed to provide the raw data collected by individuals or groups unassociated with the decision-maker. Furthermore, the prior art systems and methods rely on independently maintained information sets, tools and processes, which rapidly become inconsistent and may lead to increased inefficiency, or even compound the risk created by the emergency event or hazardous situation. Therefore, these prior art systems and methods demonstrate additional problems, and the need arises for providing effective tools for key identified decision-makers.

Yet another problem with current systems and methods is the scale for which they are provided. Many systems are designed only for a single building or site location, which fail to address other settings of emergencies. One example of an emergency event unsuited for these prior art systems is a release of hazardous materials on a public highway or a body of water. The range of responses that earlier systems are designed to provide are often limited by the low number of variables or conditions present in the information set. Most of these prior art systems do not consider the combination of multiple events when designing or implementing their program. These prior art systems and methods are particularly inappropriate for responding to terrorist activity, which may be coordinated to expose a large geographical area, or a number of discrete locations far removed from one another. Another problem present in the prior art, particularly in computer-based solutions, is the possible presence of an uncontrolled electro-magnetic field, which could entirely prevent or greatly reduce availability to the information on wireless or hardwired network devices. The prior art computer-based solutions are often inappropriate for particular decision-makers, who may not be familiar with the format of data presented, or who may be unable to quickly and easily extract the information from the electronic devices due to the size of the font on the graphic display coupled with the presence of vapors, including smoke, pervasive throughout the environment in which they are required to make the decision.

These and other problems exist in the current technology associated with designing and implementing Emergency Management Programs and Systems. Thus, a need arises in providing a system and method for designing and implementing such a program that ensures that reliable and relevant data is accessible to all decision-makers, that allows for decisions based on a consistent set of information, that allows the information and processes for using that information to be integrated horizontally and vertically amongst the varying individual and group decision-makers, that provides tools for quickly and efficiently viewing and manipulating the information appropriate for each decision-maker, and that otherwise eliminates the problems with prior art systems identified above.

SUMMARY OF THE INVENTION

A system and method are described for inputting, analyzing and disseminating information necessary for decision-makers to respond to an emergency event or hazardous situation. The system and method in a preferred embodiment provides consistency and integration at both the design and implementation phases, providing multiple individuals and groups with the information necessary to respond to both initial consequence-based decisions and follow-on consequence-based decisions, and further allows the information to be manipulated as conditions change or as additional information is received without sacrificing the consistency and integration of the system. Prior art references have occasionally referred to these types of systems as Emergency Management Programs or Emergency Management Systems.

In a preferred embodiment, the system and method provides individual and group decision-makers with tools for displaying and analyzing the information collected both prior to and during the emergency event or hazardous situation. In this preferred embodiment, the system may further include tools for providing these decision-makers with pre-analyzed information to assist the decision-maker in responding more quickly or efficiently to a high-risk emergency event. In this embodiment the architecture of the EMP or EMS includes the use of a relational database, where the information in database form is inputted and stored for access through the use of tools provided to the decision-makers. The tools in a preferred embodiment provide the decision-maker with customized sets of the necessary information to allow a conservative decision to be made under time and resource constraints, and further allows the decision-maker to input and manipulate the information as it is acquired and that influences the decision-making process. In a preferred embodiment the tools are designed to address the constraints placed on identified decision-makers, rather than to provide the most complete set of information available for the particular emergency event or hazardous situation.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 5 is a display of an event summary table in a preferred embodiment of the invention;

FIG. 6 is a display view of an integrated tool in a preferred embodiment of the invention;

FIG. 7 is a display view of another integrated tool in a preferred embodiment of the invention.

DESCRIPTION OF THE PREFERRED EMBODIMENTS

A preferred embodiment of the present invention is illustrated in the Figures and the following detailed description. It is to be expressly understood that the descriptive embodiment is provided herein for explanatory purposes only and is not meant to unduly limit the claimed inventions. Other embodiments of the present invention are considered to be within the scope of the claimed inventions, including not only those embodiments that would be within the scope of one skilled in the art, but also as encompassed in technology developed in the future. Although a chemical hazard becoming accidentally released into the environment is often used as an example of the emergency event used with this invention, these are discussed primarily for the purposes of understanding the system and method application. It is to be expressly understood that other emergency events, both accidental and intentional, such as terrorist activities, are contemplated for use with the present invention as well.

As will be understood by those familiar with the art, the present invention may be embodied in other specific forms without departing from the spirit or essential characteristics thereof. For example, the present invention is not limited in the number or location of persons or groups integrating with the system, or the number or location of other variables in the Database of Analyzed Hazards. The present invention may be used in conjunction with a variety of tools and processes, both automated and manual, and one skilled in the art will appreciate the ability of the following system and method to employ differing database and programming forms without departing from the nature of the invention. Accordingly, the disclosure of the preferred embodiment of the invention is intended to be illustrative, but not limiting, of the scope of the invention which is set forth in the following claims.

In a preferred embodiment of the invention, the system and method includes the design and implementation of at least three main elements; a central information storage location; a set of integrated tools for accessing the information; and a set of processes by which reasoned decisions are made using the tools to assess the necessary information for the conditions that are present in the event of an emergency event or hazardous situation. The system and method provides a continuous process for making decisions that are consistent with and proportional to the constraints placed on the decision-makers as a result of the event. The integrated tools provided for making the decisions are specific to the needs of the individual or group decision-makers. The information provided is contained in the central information storage location, and is comprehensive to the entire program or system, and may be integrated across each and all of the tools and processes provided to the different individual or groups. This integration exists both horizontally among different decision-makers, both initial and follow-on decision-makers, and it exists vertically from the decision-maker via the integrated tools to the central information storage location. This system and method is custom tailored to meet the conditions and consequences of an emergency event specific to the EMP, and is designed with a primary focus on the needs of the decision-makers and their particular conditions and constraints. As such, the design aspects of this system are uniquely coupled to the implementation aspects of this system, and require elaboration.

During the design stage, combinations of events, personnel and materials for each discrete location included in the scope of the EMP are evaluated. Events may include potential emergency or hazardous occurrences, such as a release of a contaminant in an uncontrolled environment, or may also include non-hazardous occurrences, such as a scheduled power outage or the presence of an electrical storm in the vicinity of the EMP facility. Personnel may include individual persons who are involved in the process of responding to the emergency event or hazardous situation, and may be either active or passive participants, meaning they may include persons who have no decision-making responsibilities, but are affected by the emergency event. Personnel may also include groups of persons, such as a Consequence Assessment Team, and may further include persons or groups who are not resident at the EMP facility or location, such as local fire, police or medical persons or groups. Personnel may also include larger groups who have responsibilities in responding to the emergency event or who may be affected by the emergency event, such as the Federal Aviation Administration, the Federal Emergency Management Agency, or the National Highway Traffic and Safety Administration. Materials may include both hazardous materials and non-hazardous materials, and may further include materials provided to assist in the control of a particular emergency event or hazardous situation or materials that are considered to be assets, which are to be protected from exposure to any risk caused by the event. Material information may also include inventory levels, both current and projected.

After all data is collected relating to the events, personnel and materials for the EMP, the next step is to compile the data and store the data in Records. Each unique combination of events, personnel, materials and discrete locations may be used to create a unique Record. Other information may be included in the Record as well, depending on the scope of the EMP and the processes employed to allow decision-makers to access and manipulate the information, as described in greater detail below. In a preferred embodiment Records are stored by alphanumerical codes or other distinguishing means, and organized in a manner to allow a user to quickly and easily locate the Records associated with a particular event, personnel, material and location combination. These Records may also be updated over time, and may be modified as future analysis leads to improved information or assumptions. One example of how a Record could be modified is by providing a time or date stamp in a field associated with a particular activity related to that Record. Records are inputted and maintained in the central storage location, which may include but is not limited to a relational database. One skilled in the art will appreciate the benefits associated with this form of providing a central storage location for large amounts of information, which may or may not reside in a single database.

In a preferred embodiment, Records may be combined with other information or additional Records to create new Records, and may or may not be assigned a new alphanumerical code or other unique identifier. In this preferred embodiment, Records may be called up from a number of different variables, including but not limited to the individual or group, or the time, location, hazard or information contained in the Record. The writing of programming language for achieving this task is within the capabilities of a person of ordinary skill in the programming arts. In alternate embodiments, the Records for a particular combination or a particularly hazardous situation may be already provided to the decision-makers in anticipation of the combination occurring, or to provide a more timely response to an identified high-risk event. The task of calling up the necessary Records may be a manual process or an automated process.

In a preferred embodiment, the Records are maintained in a central storage location labeled the Database of Analyzed Hazards. The Database of Analyzed Hazards may include other information not contained in a Record. For example, the Database of Analyzed Hazards may be comprised of a number of databases, which include differing subsets of information, but that may all be related by common variables or characters. In a preferred embodiment, the Database of Analyzed Hazards is the location where information is secured both prior to and during an emergency event. The Database of Analyzed Hazards comprises the information collected during the design process, and may include information regarding assumptions, variables or conditions, hazardous materials, including their characteristics, locations, inventory, and other information related to their use. It may also include information regarding the characteristics of the facility or areas where materials are located or may be affected by the materials, often referred to as hazardous material zones. In a preferred embodiment, the Database includes information relating to a spectrum of events that could require responsive action, such as a release of hazardous material, and further include key characteristics of those events including probabilities and levels of risk. It may also include information regarding a range of meteorological conditions under which hazardous materials could be dispersed. Other types of information may also be included in the Database of Analyzed Hazards without departing from the concepts of the preferred embodiment of the invention. The information contained in the Database of Analyzed Hazards may be collected during the design process, typically by a group of individuals known as the Emergency Preparedness Manager team. During or after an emergency event, this team or other individuals or groups may collect information for incorporation into the Database. The Database may be established with a limited number of Records obtained from early or design phase assessment activities, and expanded on over time as both real and simulated emergency events have provided additional information.

Integrated Tools may be customized for accessing the information in the Database of Analyzed Hazards, and include, but are not limited in form to notebooks, binders, charts, spreadsheets, graphical user interfaces including software applications associated with hardware devices such as computer terminals and handheld electronic or communication devices, which may vary in form to meet the decision-maker's environmental and time constraints. In a preferred embodiment, the Database of Analyzed Hazards comprises at least one relational database, which may be queried by a decision-maker to access the Records necessary to make a reasoned decision, or to input information acquired during a real or simulated emergency event or hazardous situation. One skilled in the art will appreciate the benefits associated with the functionality provided by a relational database architecture, including the ability to relate fields contained in records and to access quickly and efficiently the particular information queried, as well as the ability to modify a field and reflect the modifications across related fields through the use of the relational database. This functionality allows changes to the knowledge base to be immediately and simultaneously incorporated in all related fields and in all decision-making processes.

Integrated Tools in this embodiment are comprised of software or hardware, and also a combination of hardware and software allowing the decision-maker to access and view a display of the information queried. One aspect of the Integrated Tools of a preferred embodiment is the ability for a decision-maker to quickly sort and drill-down through Records and tables in order to display the most appropriate analyzed scenario or other information relating to a particular event or condition. In alternate embodiments, the process of accessing, sorting and displaying the information may be automated, and provide the decision-maker with the information without requiring the decision-maker to initiate the query. This may be achieved by the use of structured query language statements or other similar programming language that may be triggered upon an identified event or condition, such as the changing of the steady state of an input device. In one embodiment, this input device may be comprised of a sensing device provided to detect a critical change in temperature, pressure, volume, or other characteristic of a hazardous material. Examples of the Integrated Tools in a preferred embodiment include the display views of FIGS. 6 and 7, and are discussed in greater detail below. These examples are intended to be illustrative and not limiting to the current scope of the invention. Integrated Tools are designed primarily for overcoming the problems associated with prior art EMP and EMS systems and methods, including the problem of providing the decision-makers with more information than is required or is efficient in making a reasoned and timely response. For example, Integrated Tools may include single page or single screen displays for providing the information necessary to make a reasoned decision, as opposed to prior art systems and methods, which may provide the decision-maker with multiple-page plume diagrams, complex and difficult to read spreadsheets, or other data sets which hinder an immediate and proportional response to an emergency event. These Integrated Tools designed for particular decision-makers are an integral part of the Decision Making Processes for the particular decision-makers. Other forms and types of Integrated Tools in alternate embodiments are also discussed in greater detail below.

Decision Making Processes are formulated during the design phase with a focus on the person or groups who will be making the decisions. These processes may be tailored by the amount of information and resources available to the decision-maker. The collection and gathering of information specific to potential emergency events or hazardous situations is the first step in creating a unique Decision Making Process. Once the constraints on an individual or group decision-maker have been determined, and the responsibilities of the decision-maker have been formulated, the Emergency Preparedness Manager team may define the particular Action Criteria for the decision-maker. The Action Criteria is defined as the steps a decision-maker must take in the event of an emergency event or hazardous situation in order to fulfill their responsibilities pursuant to the EMP or EMS. This Action Criteria along with the design of Integrated Tools further defines the Decision Making Process for a particular decision-maker. The Records presented to the person or group may be expanded or contracted in number to reflect the information or data set necessary to accomplish the specific task at hand. New Records may be created for specific combinations of event, personnel, material and location information that allows an Integrated Tool to display the information in an efficient manner, as more fully described in the preceding paragraph. In a preferred embodiment, the Decision Making Processes may vary from one decision-maker to another, but consistently provide a system and method for integrating the separate decisions and other independent actions by allowing the different persons or groups to have access to information in a real-time environment, and to continuously update the data in order to perform Follow-on Decisions in addition to the Initial Decisions.

These Decision Making Processes may include the display of information that has been pre-analyzed by the Emergency Preparedness Manager team or Consequence Assessment Team. This pre-analyzed information may be performed by simulating a potential emergency event or hazardous situation and considering the various results associated with varying decisions, and then selecting the most favorable outcome. The information may also be pre-analyzed during the design process by making assumptions based on the information collected relating to a particular emergency event. These pre-analyzed information sets may be presented to the decision-maker via the Decision Making Process and the Integrated Tools without requiring modifications. This pre-analyzed information could potentially decrease the time and effort required to make a critical decision, and also could eliminate ambiguities in the range of decisions possible in a particular emergency event or hazardous situation. For example, the analysis in a given emergency event might only logically lead to one of two possible decisions, in which case the Integrated Tools would ensure that the Decision Making Process explicitly instructed the decision-maker to select the more logical decision, and take the appropriate action recommended for that decision.

In a preferred embodiment, the Decision Making Processes and the corresponding information required to initiate these Processes may differ depending on the stage of the EMP or EMS, or may also depend on the time elapsed since the emergency event triggered the initial response. For example, the decision may be one identified as an Initial Decision, typically made by the first responder, such as an incident commander, building manager, or other specified initial decision-maker. These decisions often require greater haste, and provide little or no time for significant analysis to be performed without increasing the exposure to the risk created by the emergency event. In contrast, Follow-on Decisions are typically made after activation of the EMP or EMS, and include the analysis of the Consequence Assessment Team. The individuals or groups involved with Follow-on Decisions frequently have the time to analyze a larger set of data before being required to make a decision. In most EMP or EMS implementation procedures, these types of decisions also provide for significant input and correlating creation of new Records as well. While Initial Decisions frequently involve the assessment of risk to human life, Follow-on Decisions more typically involve risks to infrastructure, and are less critical to the overall response to the emergency event.

Figure 1:
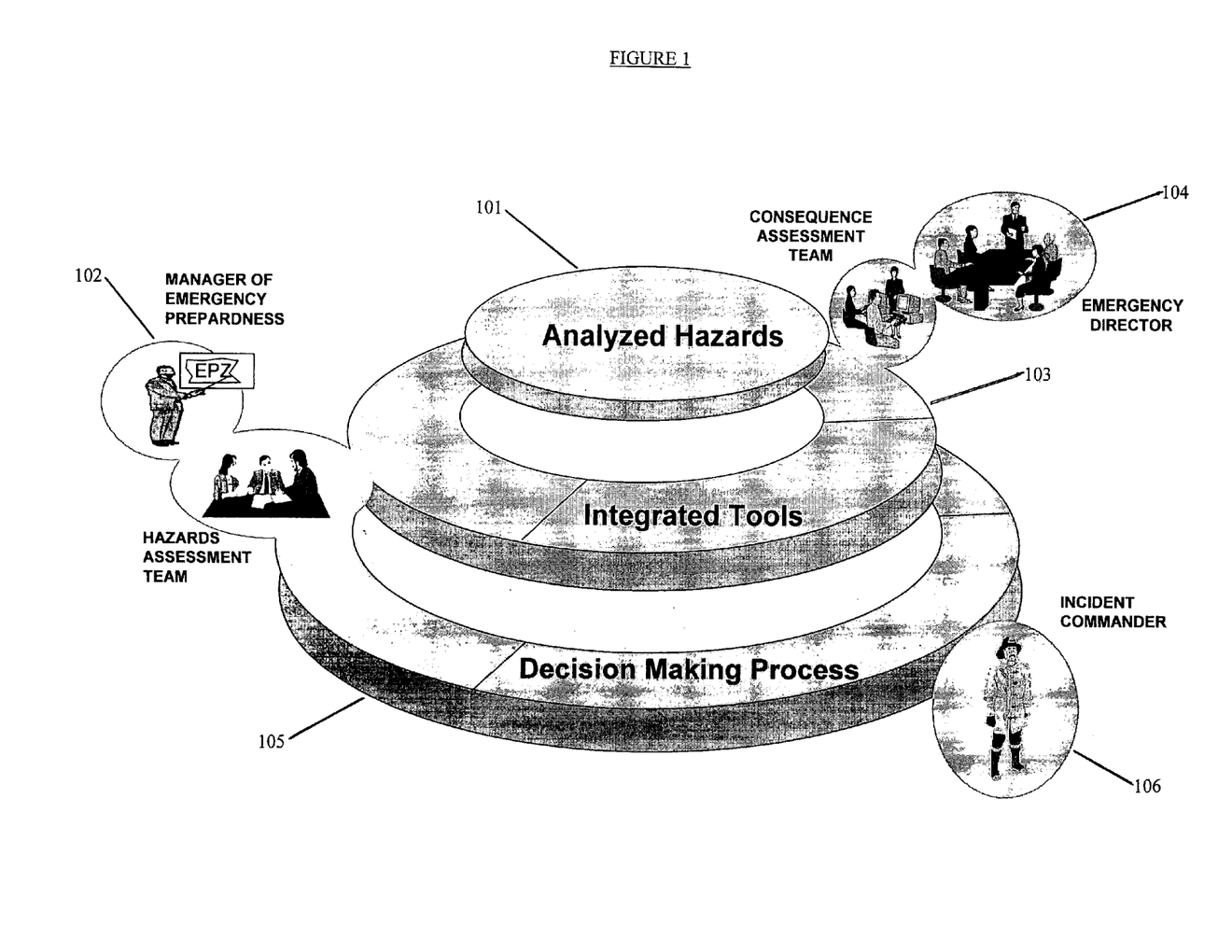
FIG. 1 is a schematic diagram of the architecture of the disclosed system and method.

Referring now in detail to FIG. 1, the system in a preferred embodiment is comprised of a common set of information labeled the Database of Analyzed Hazards 101, means for accessing the Database of Analyzed Hazards 101 labeled Integrated Tools 103, and a set of processes for making reasoned decisions labeled Decision Making Process 105. As described above, the Decision Making Process 105 is comprised of at least the steps of accessing information contained in the Database of Analyzed Hazards 101 via an Integrated Tool 103 to display the Records determined during the design process to be necessary for making a decision, and which are particular to a specific emergency event or hazardous situation. Users 102, 104, 106 of the system may be individuals or groups, such as manager(s) of emergency preparedness, hazard assessment team(s), emergency director(s), consequence assessment team(s), and incident commander(s). As shown schematically in the diagram of FIG. 1, information contained in the Database of Analyzed Hazards 101 may only be accessed by the persons or groups 102, 104, 106 involved in a particular Decision Making Process 105 through use of Integrated Tools 103. Thus, vertical integration of the system and method is achieved, which allows different persons or groups to receive data, possibly through different Integrated Tools 103 or different Decision Making Processes 105, but consistently from a central storage location. For example, the Decision Making Process 105 for a particular decision-maker such as the Incident Commander requires access to information in the Database of Analyzed Hazards 101, which may include inventory levels of a particular hazardous material located in a particular zone. This information is displayed to the Incident Commander by use of an Integrated Tool 103, which provides the Incident Commander with a process for searching and retrieving Records 130 related to the particular hazardous material. The Integrated Tool 103 further allows the Incident Commander to drill down through the relevant Records 130 to locate the most appropriate information set. Once the Records 130 are retrieved, any modification to the fields in the document are stored in the Record 130, or possibly cause a new Record 130 to be created, and this modification is recorded in the Database of Analyzed Hazards 101. A substantially similar process is used by the other types of decision-makers, which ensures that the Decision Making Process 105 is performed using the Integrated Tools 103 and further ensures the vertical integration of the various processes. The system is designed with Integrated Tools 103 to eliminate the requirement of a decision-maker to review directly the voluminous raw data contained in Database of Analyzed Hazards 101, in part by providing the appropriate format for displaying the information in a fashion suitable for the persons or groups 102, 104, 106 to make informed, reasoned and timely decisions.

Figure 2:
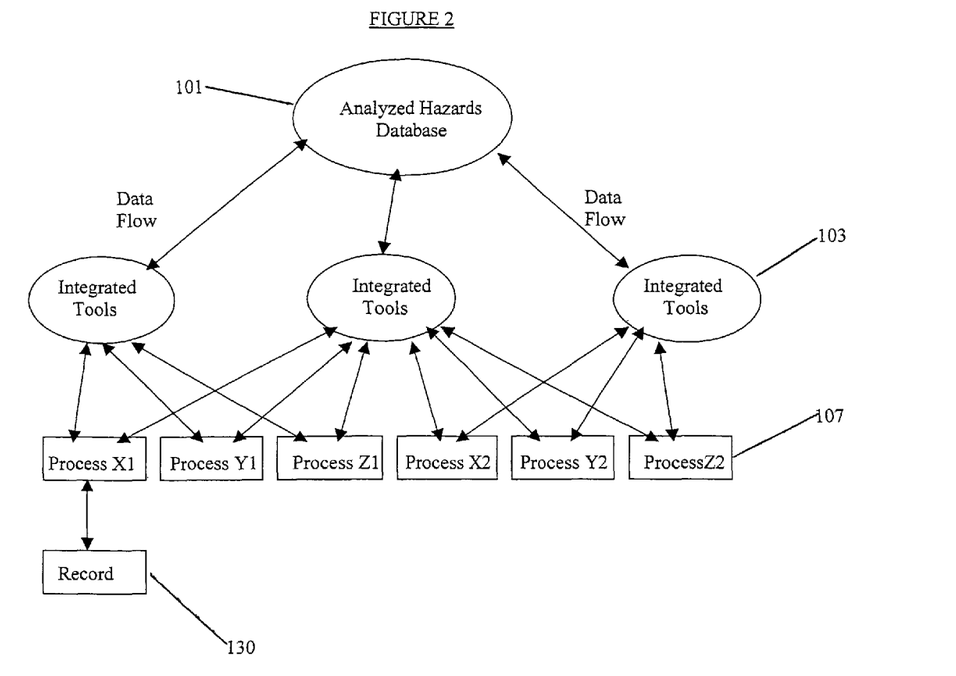
FIG. 2 is a function-block diagram of the integration of the elements of FIG. 1.

As shown in FIG. 2, system integration exists not only vertically, but also horizontally. As they are made or otherwise occur, the responses and other actions associated with a person or group 102, 104, 106 are recorded in a Record 130. The Record 130 becomes part of Database of Analyzed Hazards 101, by way of reporting that data through one of the Processes 107 via Integrated Tools 103 and back to Database of Analyzed Hazards 101. As other groups access the information in Database of Analyzed Hazards 101, a Record 130 reflects the current status of any decisions previously made by other individuals or groups. For example, the Initial Decision made by an Incident Commander will be recorded and viewable by the Consequence Assessment Team, who may rely on the information contained in the Records 130 accessed or modified by the Incident Commander to make Follow-on Decisions. Likewise, the Follow-on Decisions of the Consequence Assessment Team will also be recorded for the Incident Commander to view when making other decisions at the scene of the emergency event or hazardous situation. Some Records 130 may be viewable only, and others may be critical to multiple persons or groups and require input from each independently or dependently. Integrated Tools 103 are also coordinated to prevent Initial Decisions, Follow-on Decisions, or other action requiring input from a Process 107 or Record 130 that is active in real-time. In a preferred embodiment, this may be achieved by preventing access by more than one person or group 102, 104, 106 to a Record 130 or Process 107 while it is in use by a different individual or group, or also may be achieved by providing a field which alerts other individual or groups that the Record 130 or Process 107 is currently in use and could affect their Initial Decisions, Follow-on Decisions, or other actions. The tasks described in this paragraph, including the task of inputting new information and the task of preventing access to multiple persons or groups is considered to be within the capabilities of a person of ordinary skill in the programming arts.

As information is inputted in a new or modified Record 130 it is shared across all Integrated Tools 103 to every user. This horizontal integration may be accomplished in a variety of ways, including, but not limited to linking Records 130 and Processes 107 through a networked computer-based system, as described above via the use of relational databases, or in an alternate embodiment through a structured set of procedures for manually entering data into the Records 130 and inserting the modified records 130 into a commonly available or shared binder, chart or other document set.

Figure 3:
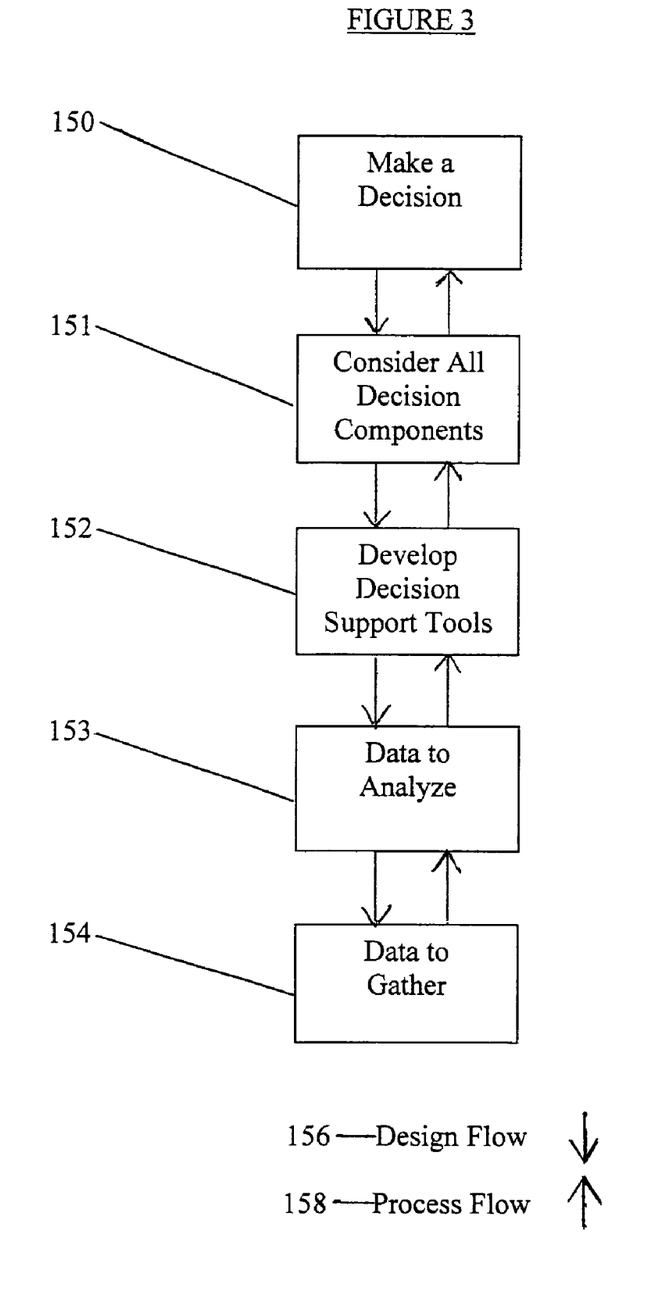
FIG. 3 is a function-block diagram of the design elements of the disclosed system and method.

As shown in the diagram of FIG. 3, the design process for the system and method in a preferred embodiment has a primary focus on protective and informed decision-making, rather than on the data that has been gathered. After the Decision 150 to be made by a particular decision-maker is determined, the next design step is to Consider All Decision Components 151. For example, one type of Decision 150 could be to evacuate a certain area or location within a facility. All Decision Components 151 may include factors necessarily considered in order to reach the particular Decision 150, and may further include sub-choices or conditions which must be met before the decision-maker can make an informed Decision 150. These two sub-elements in part make up the Action Criteria for a particular decision-maker. Once All Decision Components 151 have been determined, Decision Support Tools 152 may be designed. Tools 152 may include the types previously identified as Integrated Tools and discussed in greater detail below. With Tools 152 in place, the Data to Analyze 153 may be formulated, which may include particular sets and subsets of information, in either more discrete or more broad focus depending largely on the type of decision-maker, the consequence or risk associated with the decision, and the constraints placed on that person or group, as elaborated on in the preceding paragraphs. After the Data to Analyze 153 has been determined, the final step of collecting the Data to Gather 154 is performed. The final step is accomplished by collecting the Data to Analyze 153, and inputting it in a central storage location. This ensures that the only Data to Gather 154 is the information necessary and relevant to the decision-maker and the particular Decision Making Process. In a preferred embodiment, this central storage location is labeled as the Database of Analyzed Hazards 101 discussed in greater detail above.

This Design Flow 156 allows the system to have a Process Flow 158 that is more effective during actual emergency situations by providing the decision-maker with only the information necessary to make a quick and reasoned decision, and focusing the data on the decision-makers' needs, as opposed to the tendency of the design team to merely provide the greatest volume of data that can be collected and analyzed under limited or no constraints. It also prevents unnecessary gathering of data or over-analysis of irrelevant data to the emergency event or hazardous situation, which in turn may delay or frustrate the decision-making process, and this benefit may be realized during subsequent analyses or collection of information following a real or simulated emergency event or hazardous situation. This decision-maker focus thus improves the speed and efficiency of both the Design Flow 156 and the Process Flow 158, and otherwise solves the problems identified above with prior art programs and systems.

Figure 4:
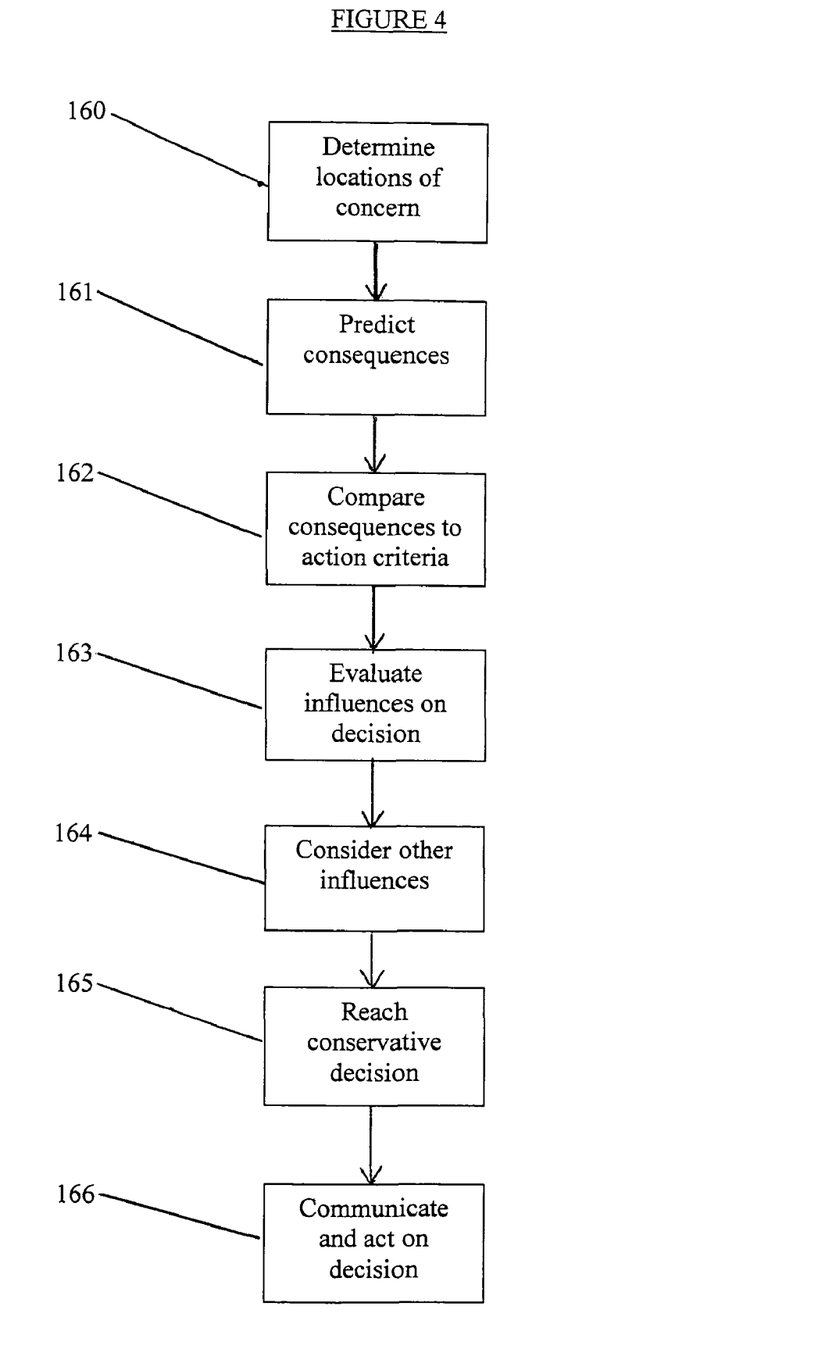
FIG. 4 is a function-block diagram of the implementation process of the disclosed system and method.

After data has been collected and initial variables and considerations have been determined, and the Decision Making Processes and Integrated Tools have been created and tested, the implementation process may commence. FIG. 4 is a function-block diagram of the implementation process of the disclosed system and method. In alternate embodiments existing data and variables may be used to eliminate much of the design process described above, and subsequently the method of FIG. 4 may be employed. In a preferred embodiment, the first step in a real or simulated emergency event is to determine the locations or areas of concern 160, and predict the consequences 161 for each. The consequences may be risks to human lives, or to assets, or may be other risks requiring protective action. In a preferred embodiment this first step is accomplished by using Integrated Tools 103 to access Records 130 in the Database of Analyzed Hazards 101. The consequences 161 are pre-determined information sets contained in a Record 130, which are compared to the Action Criteria 162 provided for each individual or group decision-maker. The Action Criteria 162 include the instructions or responsibilities given to a particular decision-maker, and are described in greater detail above. In a preferred embodiment, the Action Criteria 162 may be included in a Record 130. After the comparison has been made, the consequences 161 are further evaluated 163 to weigh any additional influence by the decision-maker. Once all other influences 164 have been considered, the decision-maker reaches a conservative decision 165. In a preferred embodiment, the conservative decision may be pre-analyzed as well, and provides the decision-maker with a range of responses, such as a set distance away from the site for evacuation, or a time to prevent contamination. This pre-analysis may be performed by the Emergency Preparedness Manager team or a different person or group involved with the process described above and in FIG. 3, and provided to the decision-maker in the appropriate Record 130. In a preferred embodiment the pre-analyzed conservative decision may be different depending on whether the decision to be made is an Initial Decision or a Follow-on Decision, and displayed as such in the Record 130. This conservative decision 165 may also be one that is not pre-analyzed, and instead is reasoned by the decision-maker without any pre-determined decision options. Once the decision 165 has been made, the decision-maker acts on the decision and communicates the decision 166 back for incorporation into the entered Record 130. This process may be achieved in either an automated or non-automated system, as discussed in detail above. This step ensures the consistency necessary for other persons and groups to make reasoned decisions based on all previously performed actions.

The procedure of the previous paragraph describes generally both the Decision Making Process 105 as well as the Processes 107 of FIGS. 1 and 2 respectively. In a preferred embodiment, the Process 105 or Processes 107 for a specific decision-maker such as an Incident Commander may be described more specifically. During the design phase, the Action Criteria 162 for the Incident Commander have been determined, and include the key event indicators used by the Incident Commander to query the appropriate Records 130 in the event of an emergency or hazardous situation. The first step in the Process 105 for the Incident Commander is therefore to assess the key event indicators. It is possible that one or more of the key event indicators will be unknown at the time a response is required, and this possibility is discussed in greater detail below with respect to FIG. 7. However, regardless of the number of key event indicators known or unknown, the Incident Commander is able to determine an appropriate Emergency Action Level for the particular event. This is an initial determination based in part on the risk present and the number of people or locations affected. Once the key event indicators and the EAL have been determined, the Incident Commander may query the key event indicators in the Database of Analyzed Hazards 101 and select the appropriate Records 130. This query may be performed by a particular Integrated Tool 103, and further define the Decision Making Process 105. The use of the information in the Records 130 allows the Incident Commander to develop or select a Protective Action Plan. A Protective Action Plan relates to an action or actions for responding to the unique combination of event, personnel, material and location information associated in the Records 130. The Protective Action Plan includes a number of responses or actions, which vary and are based on the event classification, which may be determined by the Incident Commander or provided by the Consequence Assessment Team or other individual or group decision-maker. After the appropriate actions have been taken the Incident Commander communicates the results of the decisions and actions back to the Database of Analyzed Hazards 101 by inputting the information in to the Records 130. The Incident Commander then takes the necessary action, and completes the Decision Making Process 105. In a preferred embodiment, this procedure allows critical decisions to be made in less than five minutes. Thus, the Decision Making Process 105 for the Incident Commander is described. The part of the procedure relating to the display and input of information in the Records is described in greater detail below with respect to FIG. 7.

In a preferred embodiment, one or more event summary tables may be employed by the persons or groups to view multiple events on an integrated display. FIG. 5 is an example of a display view of an event summary table in a preferred embodiment. The Table 180 includes a column for each Event Record 182, and may also include other customized data columns based on the system criteria. The Table 180 in a preferred embodiment can be used to perform early or Initial Decisions, or to evaluate Follow-on Decisions as the emergency progresses into later stages. Such a Table 180 further accommodates the ability of a user to ensure integration horizontally and vertically by comparing the data used by different persons or groups, and also to correct assumptions made during the design process. Such a Table 180 may also allow a user to compare Initial Decisions and Follow-on Decisions, and determine whether they are proportional to the risk created by the emergency event. This process further allows a user of the system to compare decisions made by different decision-makers and identify inconsistencies, and may also allow a user to re-execute Decision Making Processes 105 for areas that are either removed from or introduced to new risks created by the emergency event. In a preferred embodiment, the Table 180 is provided during all phases of the EMP or EMS to ensure that no two users are able to make decisions based on inconsistent data. This is important both for determining whether an incident rises to the level necessary to trigger an Emergency Management Program or System, whether sufficient and proportional action has been taken during the emergency event. This is also important for determining whether to allow Follow-on Decisions to continue, and to determine when to declare that the emergency has been sufficiently contained to recall any persons who have been evacuated.

FIG. 6 is an example of a display view of an Integrated Tool 103 in a preferred embodiment of the invention. This particular Integrated Tool is presented in a graphical display suitable for use with a computer terminal or other similar workstation, but may also be presented in printed form and arranged by unique identifiers in a binder or other compilation of information as elaborated on above. The Consequence Assessment Team or Emergency Preparedness Manager team produces analyses and information to support other decision-makers in consequence-based decision-making. A first rapid set of these analyses may include a meteorological summary, hazard summary, Material Safety Data Sheets (MSDS) for hazardous materials, initial decision review, consequence analysis summary, protective action recommendation, and event classification recommendation. As more information is collected and Follow-on Decisions are required, the Consequence Assessment Team may update and modify their analyses and information and provide the updated data to the other decision-makers. In a preferred embodiment, Inputs 190 are presented to a user via this Integrated Tool 103 of FIG. 6 via pick-lists, which incorporate pre-determined variables identified during the design process and which correlate to the analyses performed by the decision-maker or provided by the Consequence Assessment Team. Outputs 192 may include multiple options for the decision-maker, such as a distinct set of criteria according to a particular first set of consequences 193 and a particular second set of consequences 194. Outputs 192 may also include required information necessary to ensure the integration of the system and method as described above. The Integrated Tool 103 in a preferred embodiment provides the decision-maker with the ability to change Inputs 190 and manipulate the information to produce different Outputs 192, which then may be compared in order to determine the appropriate event classification or other variable necessary for future decision-making processes. In alternate embodiments either greater or fewer numbers of consequences 161 may be used, and additional variables may be presented by the Inputs 190 to aid the decision-maker in reaching a decision. This Integrated Tool 103 in a preferred embodiment is identified by the inventor as the Timely Initial Assessment (TIA) Tool™.

FIG. 7 is an example of a display view of another Integrated Tool 103 in a preferred embodiment of the invention. This Integrated Tool 103 is one more typically used by a decision-maker located at the scene of the emergency event, such as an Incident Commander, as compared to the TIA Tool™ described in the preceding paragraph. This FIG. 7 is a display view of a table that is used by a decision-maker to view information contained in the Database of Analyzed Hazards 101 and assist in selecting the most appropriate response to an emergency event or hazardous situation. This table includes information identified above as the key event indicators, and in this embodiment specifically includes the Event Type 210 and the Area 212. This information may be used to search and display the appropriate table. Other information contained in the table includes the Locations 214 impacted by the event in this Area 212, the Protective Action Plan categories 218, the Materials 216 present in this Area 212, the Event Classification 220, and an Emergency Action Level number 222. This table allows a decision-maker to make an informed decision by selecting a Protective Action Plan category 218 based on the Materials 216 present and their quantity, here shown as the quantity in pounds (lbs). This table also allows the decision-maker to determine or confirm that the appropriate Event Classification 220 is identified. This table further includes Planning Inventory 224 for the particular Materials 216 with the corresponding quantities and Event Classifications 220. This section further includes the distance (in feet) within which protective actions are warranted to prevent or limit exposure, labeled here as the PAC or Protective Action Criterion, and also includes the distance (in feet) within which the urgent protective actions are warranted to prevent or limit life-threatening health effects, labeled here as the TEL or Threshold of Early Lethality. The Planning Inventory 224 allows the decision-maker to compare known quantities and distances and scale a response based on the information contained in this section of the table. In a preferred embodiment the actions and other information specific to the selected Protective Action Plan category 218 may be linked to this table, and for example, may be displayed when the decision-maker selects one of the category numbers at the top of each column in this section of the table. This step of linking the documents for each Protective Action Plan category 218 and the programming of the same is considered to be within the capability of a person of ordinary skill in the programming arts. In a preferred embodiment, this table may include other information, such as a link to more specific information including MSDS for the Materials 216 included in the table. In a preferred embodiment, this display is part of an Integrated Tool 103 identified by the inventor as the Emergency Action Level (EAL) Tool™.

As shown in FIG. 7, the table may also include information for certain fields where the precise information necessary to select the most appropriate Protective Action Plan category 218 is unknown or uncertain. The first row of this table provides the decision-maker with a default analysis, which assumes the most toxic or hazardous substance in the Area 212, and therefore provides the most conservative recommendations for selecting the Protective Action Plan category 218 and Event Classification 220. In alternate embodiments, this table may display information corresponding to site-wide hazards, as opposed to Area 212 specific hazards. In another alternate embodiment, the table displays Event Classifications 220 that are conditional, because the distance to the nearest site boundary is not known.

Figure 8:
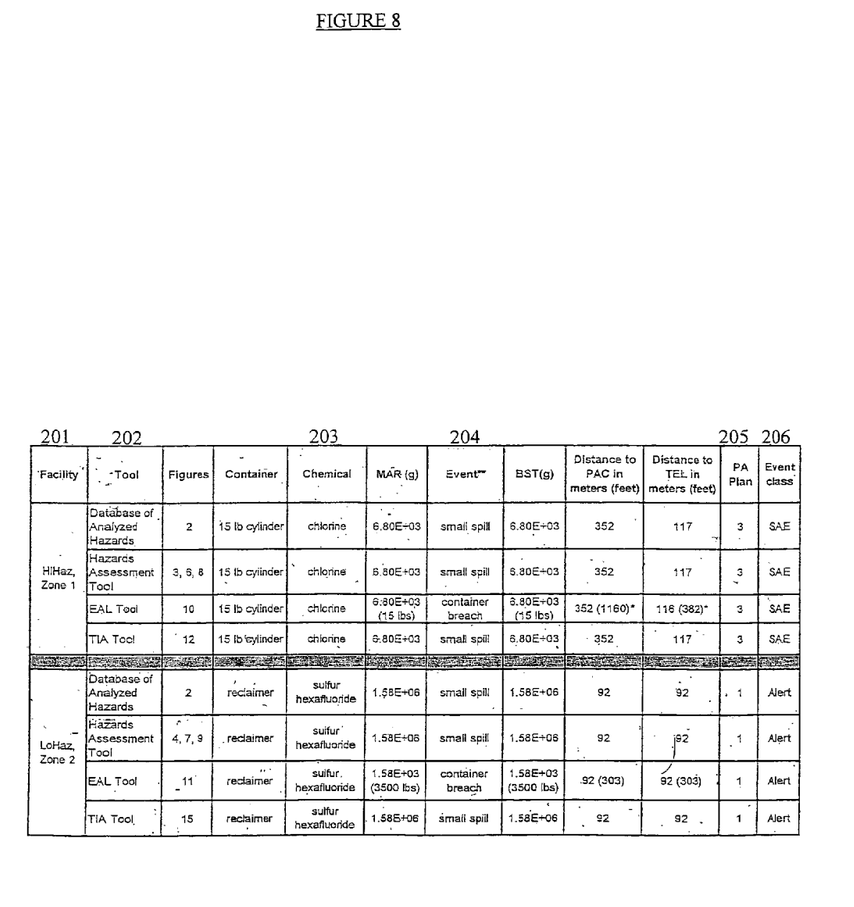
FIG. 8 is a computer display of a tool-linking table in a preferred embodiment.

FIG. 8 is an example of a computer display of a tool-linking table useable in a preferred embodiment. This table allows users to view on a single display the different facilities 201, integrated tools 202, hazards 203 and events that have occurred or been performed 204. The table also links these events by assigning similarly situated Decisions with associated plan numbers 205 and event classifications 206. Such Assignment permits the user to more efficiently recall the necessary information for decision-makers involved with particular integrated tools 202 and facilities 201. Thus, FIG. 8 is yet another example of how the system and method in a preferred embodiment may be integrated horizontally and vertically throughout the Integrated Tools 103 and Decision Making Processes 105.

Thus, a system and method for designing and implementing an EMP or EMS has been described. Those with skill in the art will realize that while the description above has made reference to both preferred and alternate embodiments, various modifications to these embodiments would be made without departing from the spirit and scope of the invention, which should be understood with reference to the following claims and their equivalents.

What is claimed is:

1. A method of creating a computer-executable decision making system using one or more computer terminals, the method comprising:

identifying a decision to be made in response to a particular emergency condition using one or more of the computer terminals;

defining decision components that include one or more of factors to be considered, sub-choices to be made, and conditions to be met prior to making the identified decision, upon which the identified decision is to be based using one or more of the computer terminals, responsive to the identifying a decision to be made operation;

identifying record data corresponding to the decision components defined for the identified decision using one or more of the computer terminals, responsive to the defining operation;

collecting the identified record data corresponding to the decision components within one or more of the computer terminals, responsive to the identifying record data operation; and storing the collected record data into one or more storage media accessible through one or more of the computer terminals in association with the identified decision, responsive to the collecting operation.

2. The method of claim 1 wherein the identified record data includes one or more unique records, each unique record combining event and material data.

3. The method of claim 1 further comprising:

identifying emergency specific data corresponding to the decision components defined for the identified decision.

4. The method of claim 1 further comprising:

identifying a decision-maker that will make the identified decision; and filtering the identified record data to present record data relevant to the identified decision-maker for the identified decision.

5. The method of claim 1 further comprising:

identifying a decision-maker that will make the identified decision;

defining a decision-making environment that will affect the decision-maker while making the identified decision.

6. The method of claim 1 further comprising:

implementing into the decision making system one or more decision support tools, each decision support tool providing a user interface allowing a decision-maker to access at least a filtered portion of the identified record data relevant to the decision-maker for the identified decision.

\* \* \* \* \*